April 19, 1955  J. L. HILTON  2,706,452
GEAR PUMP
Filed Feb. 1, 1952  2 Sheets-Sheet 1

Inventor:-
John Leslie Hilton
By- William E. P. Bayly
Attorney.

April 19, 1955   J. L. HILTON   2,706,452
GEAR PUMP
Filed Feb. 1, 1952   2 Sheets-Sheet 2
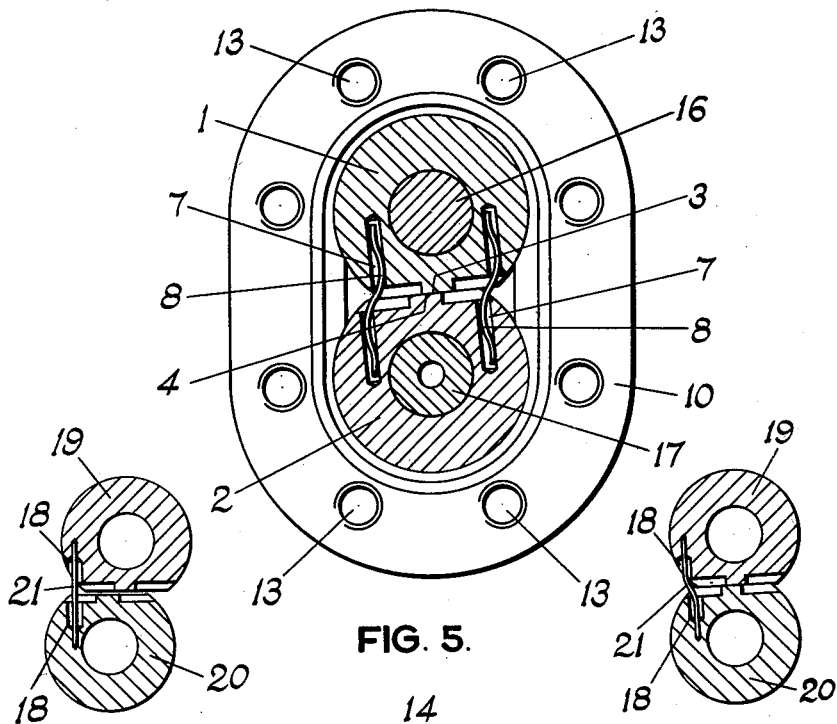
FIG. 5.
FIG. 7.   FIG. 8.
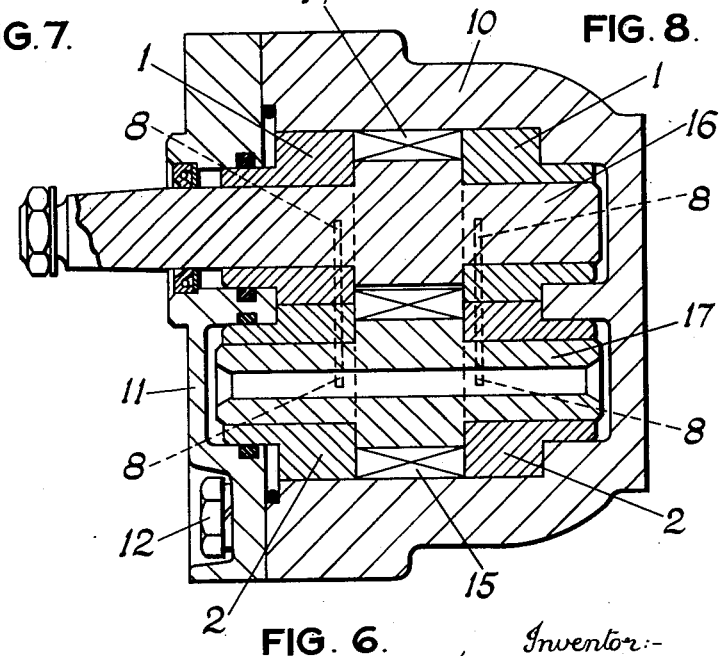
FIG. 6.
Inventor:-
John Leslie Hilton
By:- William E. P. Bayly
Attorney.

United States Patent Office 2,706,452
Patented Apr. 19, 1955

2,706,452

GEAR PUMP

John Leslie Hilton, Hornchurch, England, assignor to The Plessey Company Limited, Ilford, England, a British company Application February 1, 1952, Serial No. 269,450

3 Claims. (Cl. 103—126)

This invention relates to high pressure liquid displacement gear pumps.

In gear pumps having slidably mounted end bearings or bushes of the same, or nearly the same, diameter as the gears, flat surfaces are provided locally on the peripheries of the bearings, where they approach one another to permit assembly, and the clearance between these flat surfaces is eliminated by rotating the bushes in their housings, in the same direction, until the faces are in intimate contact with one another.

As there is no positive means of maintaining the bearings in this position they are liable to turn in a reverse direction, thereby causing the flat surfaces to separate and allowing liquid at the high pressure side of the pump to escape between the flat surfaces to the low pressure side of the pump.

The object of this invention is to provide means to maintain pressure contact between the flat surfaces on adjacent bearings.

According to the present invention, for maintaining pressure contact between the flat surfaces of the adjacent end bearings of a gear pump, and elongated resilient means consisting for example of a rod or leaf of resilient material each said rod or leaf being adapted to be assembled with its opposite ends in opposed pockets provided in each pair of adjacent bearings, the opposed pockets being disposed relatively to one another in an assembled pump so that the resilient rod or leaf is subjected to elastic deformation and imposes a turning moment on each bearing to maintain their contacting flat surfaces in pressure contact with one another.

Preferably each bearing is provided with two pockets, the pockets being positioned one on either side of the bore of the bearing and extending inwardly from the flat surface of the bearing. If desired additional pockets may be provided to receive further resilient members so as to increase the pressure exerted on the flat faces of adjacent bearings.

In order that the invention may clearly be understood and carried into effect the same will now be described by aid of the accompanying drawings in which:

Figs. 5 and 6 show respectively in side view and elevation, both in section, a gear pump having a bearing assembly according to the present invention.

Figs. 7 and 8 show diagrammatically on a smaller scale an alternative bearing assembly, using a strip or rod of resilient material that has not been pre-formed.

Figure 1:
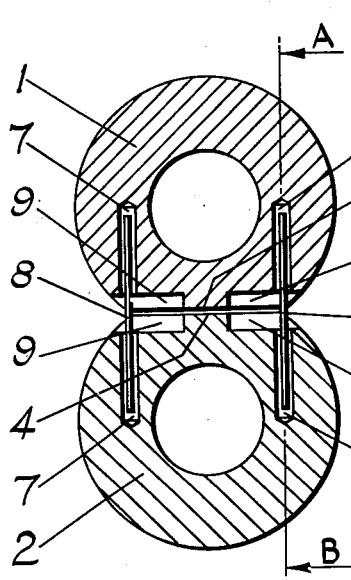
Figs. 1 and 2 show diagrammatically the initial step in the assembly of two end bearings for a gear pump, the resilient means being in the shape of a preformed strip or rod of resilient material, Fig. 2 being a section on line A—B, Fig. 1.
Figure 2:
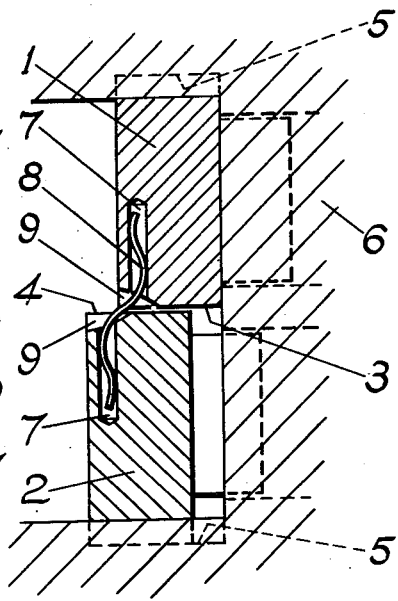

Referring to Figs. 1 and 2, end bearings 1 and 2 have tangential flat surfaces 3 and 4 and pockets 7, which receive the ends of resilient members 8, which may be of spring steel wire. The resilient members 8 are formed to give the desired amount of spring loading, when used in conjunction with pockets 7 which are symmetrically disposed relative to the flat surfaces.

To assemble the adjacent end bearings 1 and 2 in the bearing housing the spring steel wires 8 are positioned in the pockets 7. The bearings are then assembled as a unit in the bores of the bearing housing with one bearing axially displaced from the other as shown in Fig. 2 and with the pockets 7 in alignment with one another as shown in Fig. 1.

Figure 3:
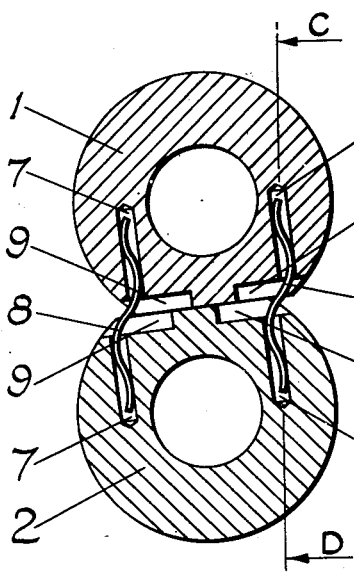
Figs. 3 and 4 are views similar to Figs. 1 and 2 but showing the two end bearings in the final assembly position, Fig. 4 being a section on line C—D, Fig. 3.
Figure 4:
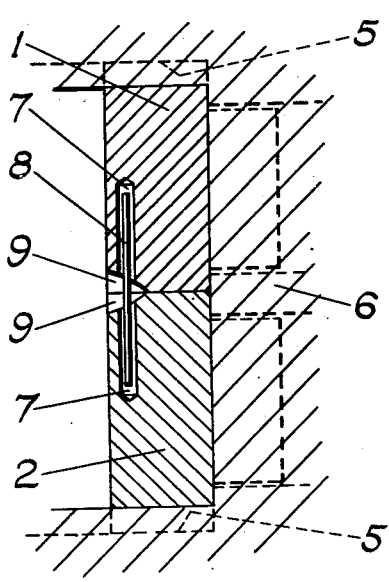

The bearings are then rotated so that the pockets 7 assume the positions shown in Figs. 3 and 4 the resilient means 8, as a result of the final disposition of the pockets, being subjected to elastic deformation to impose a turning moment on each bearing which is resisted by pressure between the flat surfaces 3 and 4.

Figs. 5 and 6 show a practical construction of gear pump incorporating a bearing assembly having the resilient means of the present invention.

The gear pump comprises a pump casing 10 having a removable cover plate 11 at one end, the cover plate being secured in position by a ring of screws 12 which are screwed into tapped holes 13 in the end of the pump casing.

The pump gears 14 and 15 are formed integrally with shafts 16 and 17 respectively, the shaft 16 of the gear 14 being extended to project through the end cover plate 11 and adapted to be connected in driving engagement with an electric motor or other driving source.

The gear shafts 16 and 17 are supported on either side of the associated gears by bearings 1 and 2, said bearings are in axially floating engagement with side faces of the gears 14 and 15 the interior of the pump casing being machined to provide parallel intersecting chambers in which the gears and bearings are housed.

The bearings have flat surfaces 9 and are assembled in the chambers with the flat surfaces of adjacent bearings in contact with one another and situated on the line of intersection between adjacent chambers.

Each bearing is provided with pockets 7 for the reception of the resilient means 8 which operate to preload the adjacent end bearings in the manner described in connection with Figs. 1 to 4.

The direction of the turning moment imparted by the resilient means to the bearings is preferably related to the direction of rotation of the pump gears.

Referring to Figs. 7 and 8, the pockets 18 in the bearings 19, 20 are arranged asymmetrically on one side of the centre line and a strip or rod 21 of resilient material which has not been preformed is inserted into the respective counterbored pockets 18.

To assemble bearings provided with this resilient means, a turning moment is applied to the bearings 19 by means of hand tools engaging their bores, to deflect the resilient means sufficiently to allow the bearings to be inserted in the housing 10. After removal of the hand tools the bearings occupy the position shown in Fig. 8.

I claim:

1. In a gear pump, including a housing a pair of intermeshing pumping gears rotatably disposed in said housing, a pair of axially movable bushings mounted on opposite sides of the intermeshing pumping gears within the housing, each said pair of bushings having contacting mating flat surfaces, at least one pair of bushings being counterbored in their mating surfaces, an elongated resilient member having opposite ends inserted in the counterbores in said bushings, said bushings on assembly are displaceable axially relative to one another and rotated in said housing whereby said elongated resilient member is subjected to deformation and maintains the mating surfaces in pressure contact in their final assembly position.

2. In a gear pump, including a housing, a pair of intermeshing pumping gears rotatably disposed in said housing, a pair of axially movable bushings mounted on opposite sides of the intermeshing pumping gears within the housing, each said pair of bushings having contacting mating flat surfaces, at least one pair of bushings being counterbored in their mating surfaces, a preformed elongated resilient member having opposite ends inserted in the counterbores in said bushings, said bushings on assembly are displaceable axially relative to one another, and rotated in said housing whereby said preformed resilient member is subjected to elastic deformation and maintains the mating surfaces in pressure contact in their final assembly position.

3. In a gear pump including a housing, a pair of intermeshing pumping gears rotatably disposed in said housing, a pair of axially movable bushings mounted on opposite sides of the intermeshing pumping gears within the housing, each said pair of bushings having contacting mating flat surfaces, each pair of bushings having two sets of counterbored pockets in their mating surfaces, an elongated resilient rod having opposite ends inserted in each set of counterbored pockets in said bushings, said bushings on assembly being displaceable axially relative to one another, and rotated in said housing whereby said elongated resilient rods are subjected to elastic deformation and maintain the mating surfaces in pressure contact in their final assembly position.

References Cited in the file of this patent

UNITED STATES PATENTS

| | | |
|---|---|---|
| 2,420,622 | Roth et al. | May 13, 1947 |
| 2,487,732 | Schanzlin | Nov. 8, 1949 |